US008210913B2

(12) United States Patent
De Marino et al.

(10) Patent No.: US 8,210,913 B2
(45) Date of Patent: Jul. 3, 2012

(54) AIR-DISTRIBUTION SYSTEM, WITH CONTACTLESS ACTIVATION OF AIR OUTLETS

(75) Inventors: Silvio De Marino, Orbassano (IT); Marco Biasiotto, Orbassano (IT); Andrea Perosino, Orbassano (IT); Alessandro Zanella, Orbassano (IT)

(73) Assignee: C.R.F. Societa Consortile per Azioni, Orbassano (Turin) (IT)

( * ) Notice: Subject to any disclaimer, the term of this patent is extended or adjusted under 35 U.S.C. 154(b) by 804 days.

(21) Appl. No.: 11/695,910

(22) Filed: Apr. 3, 2007

(65) Prior Publication Data
US 2008/0108292 A1 May 8, 2008

(30) Foreign Application Priority Data
Apr. 5, 2006 (EP) .................................... 06425239

(51) Int. Cl.
*B60H 1/34* (2006.01)
(52) U.S. Cl. ........................................ 454/152; 454/155
(58) Field of Classification Search .................... 454/75, 454/69, 70, 152, 155, 156; 250/221
See application file for complete search history.

(56) References Cited

U.S. PATENT DOCUMENTS

| | | | | |
|---|---|---|---|---|
| 4,708,494 A * | 11/1987 | Kleinerman | .................. | 374/161 |
| 4,894,952 A * | 1/1990 | Trett et al. | .......................... | 49/25 |
| 5,103,085 A * | 4/1992 | Zimmerman | .................. | 250/221 |
| 5,397,890 A * | 3/1995 | Schueler et al. | .............. | 250/221 |
| 5,637,863 A * | 6/1997 | Sanborn et al. | ............... | 250/221 |
| 5,871,232 A * | 2/1999 | White | ......................... | 280/735 |
| 5,933,288 A * | 8/1999 | Plesko | ......................... | 359/896 |
| 6,304,178 B1 * | 10/2001 | Hayashida | ................. | 340/545.1 |
| 6,386,965 B1 * | 5/2002 | Greenwald et al. | ............. | 454/75 |
| 6,554,696 B2 * | 4/2003 | Kowalski et al. | .............. | 454/155 |
| 6,564,620 B1 * | 5/2003 | Jaeger | ................................ | 73/86 |
| 6,659,358 B2 * | 12/2003 | Kamiya et al. | ............... | 236/49.3 |
| 7,115,856 B2 * | 10/2006 | Peng et al. | .................... | 250/221 |
| 7,164,117 B2 * | 1/2007 | Breed et al. | ..................... | 250/221 |
| 7,497,251 B2 * | 3/2009 | Ichishi et al. | ................. | 165/202 |
| 8,057,288 B2 * | 11/2011 | Konet | ........................... | 454/155 |
| 2002/0019213 A1 * | 2/2002 | Yoshinori et al. | ............. | 454/155 |
| 2002/0072321 A1 * | 6/2002 | Kowalski et al. | ............. | 454/155 |

(Continued)

FOREIGN PATENT DOCUMENTS
DE 10043382 A1 3/2002
(Continued)

OTHER PUBLICATIONS
European Search Report from EP 06425239.8 dated Aug. 29, 2006.

*Primary Examiner* — Steven B McAllister
*Assistant Examiner* — Brittany E Towns
(74) *Attorney, Agent, or Firm* — Heslin Rothenberg Farley & Mesiti P.C.; Victor A. Cardona, Esq.

(57) ABSTRACT

A system for air distribution in the passenger compartment of a vehicle, for example a motor vehicle, includes at least one outlet for outflow of air into the passenger compartment, which can be activated by putting one's hand at a short distance therefrom without touching it. Associated to the air outlet is an optical sensor, which is set at distance from the air outlet and is optically connected to a window adjacent to the air outlet.

11 Claims, 5 Drawing Sheets

U.S. PATENT DOCUMENTS

2005/0041936 A1* 2/2005 Billet et al. .................... 385/93
2006/0105698 A1* 5/2006 Butera et al. .................. 454/256

FOREIGN PATENT DOCUMENTS

| DE | 10121909 | A1 | | 11/2002 |
|---|---|---|---|---|
| EP | 1544005 | B1 | | 5/2006 |
| EP | 1659011 | A1 | | 5/2006 |
| JP | 63255116 | | | 10/1988 |
| JP | 2002100268 | A | * | 4/2002 |
| JP | 2004122802 | A | * | 4/2004 |
| JP | 2007230325 | A | * | 9/2007 |
| WO | WO2004065149 | A1 | | 8/2004 |

* cited by examiner

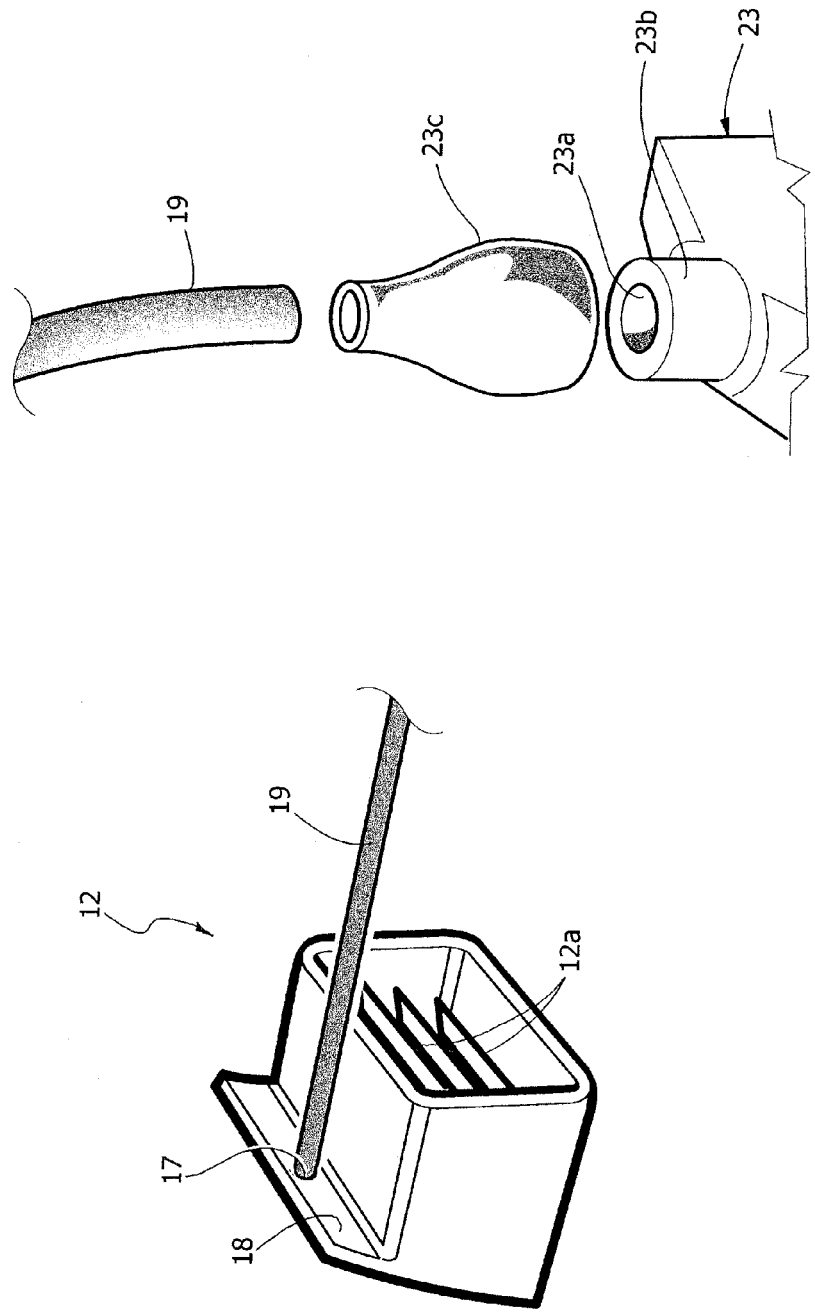

AIR-DISTRIBUTION SYSTEM, WITH CONTACTLESS ACTIVATION OF AIR OUTLETS

CROSS REFERENCE TO RELATED APPLICATIONS

This application claims priority from European patent application No. EP06425239.8, filed on Apr. 5, 2006, the entire disclosure of which is incorporated herein by reference.

BACKGROUND OF THE INVENTION

The present invention relates to systems for air distribution, in particular into the passenger compartment of a vehicle, for example, a motor vehicle, of the type comprising at least one outlet for outflow of air into the passenger compartment, a duct for supplying a flow of air to said air outlet, and means for activating the air outlet, i.e., for controlling opening of said air outlet and/or for enabling supply of a flow of air to the air outlet through said duct, in which the aforesaid activation means include a proximity sensor, which is associated to said air outlet in a position adjacent thereto and is designed to issue at output an electrical signal for activation of the air outlet following upon detection of the presence of a body at a short distance from the air outlet.

A system of the type described above is known from the document No. US 2002/072321. In said known solution, a hatch associated to an air outlet is automatically opened following upon detection of the body of an occupant of the seat in front of the air outlet and can be reclosed only manually. In addition, activation of the sensor associated to the air outlet cannot be controlled by the occupant, in so far as it occurs in any case once the occupant occupies the seat.

The European patent application No. EP 04425861.4, filed in the name of the present applicant and still secret at the date of filing of the present patent application, proposes a system in which said sensor is designed to be activated only when a body is set adjacent thereto, for example, when a hand is put in front of it (so that the air outlet is, instead, not activated by the mere presence of an occupant on the seat), and the aforesaid activation means further comprise:

an actuator, designed to switch said air outlet from the de-activated condition to the activated condition or from the activated condition to the de-activated condition; and an electronic control unit, designed to receive a signal issued by said sensor and to control said actuator in such a way that, whenever the sensor is activated, for example by putting one's hand at a short distance therefrom, without touching it, the actuator brings the air outlet from the condition in which it is found, whether activated or de-activated, to the opposite condition.

SUMMARY OF THE INVENTION

The purpose of the present invention is to provide a system of the type already proposed by the present applicant that will be particularly simple and inexpensive to produce, whilst at the same time being efficient as regards operation as well as convenient to use.

With a view to achieving said purpose, the subject of the invention is an air-distribution system of the type already proposed in the preceding European patent application No. EP 04425861.4 filed in the name of the present applicant and further characterized in that said sensor is set at a distance from said air outlet and is optically connected to a window adjacent to the air outlet via a light guide.

Preferably, said light guide is an optical fibre.

Once again in the case of the preferred embodiment, the sensor comprises an optical emitter, designed to emit an optical signal through said light guide and at output from said window, and an optical receiver, designed to receive radiation reflected by a body set in front of said window, the reflected radiation returning through said window and through said light guide. Preferably, said emitter and said receiver are an infrared emitter and an infrared detector.

According to a further preferred characteristic, the emitter is controlled by said electronic control unit in such a way as to emit an encoded optical signal, and said electronic control unit is connected to said receiver and is programmed for distinguishing between the optical signals received by said receiver, following upon a reflection of the signal issued by said emitter, from the optical signals due to other causes. In this way, the air outlet is prevented from accidentally switching its state, for example on account of a ray of light coming from outside.

Once again in the case of the preferred embodiment, said light guide is also used for conveying the light emitted by light-source means (for example, a LED) as far as said window, and said light-source means are controlled by said electronic control unit in such a way as to cause a switching of state (off/on) or cause a colour switching according to the condition (activated/de-activated) of the air outlet. In this way, the user can understand in which state the air outlet is by simply checking whether the window is lit up or not, or, for example, whether it is green or red.

According to a first alternative, the actuator is designed to drive displacement of a plurality of oscillating slats or other mechanical closing means associated to the air outlet between the condition of closing and the condition of opening of the air outlet.

In a variant, said actuator is instead designed to deflect in the aforesaid supply duct a flow of air coming from a source for supply of conditioned air.

The invention can be applied both to air outlets for airing the passenger compartment of a motor vehicle and to air outlets for airing the passenger compartment of an aircraft, or else to air outlets for airing an environment in a building.

BRIEF DESCRIPTION OF THE DRAWINGS

The invention will now be described with reference to the annexed plate of drawings, which are provided purely by way of non-limiting example, and in which:

FIG. 3 is a perspective view at an enlarged scale of a detail of the system of FIG. 2;

FIG. 4 is an exploded view at an enlarged scale of a detail of FIG. 2, which illustrates an additional component preferably envisaged by the invention;

DETAILED DESCRIPTION OF THE INVENTION

Figure 1:
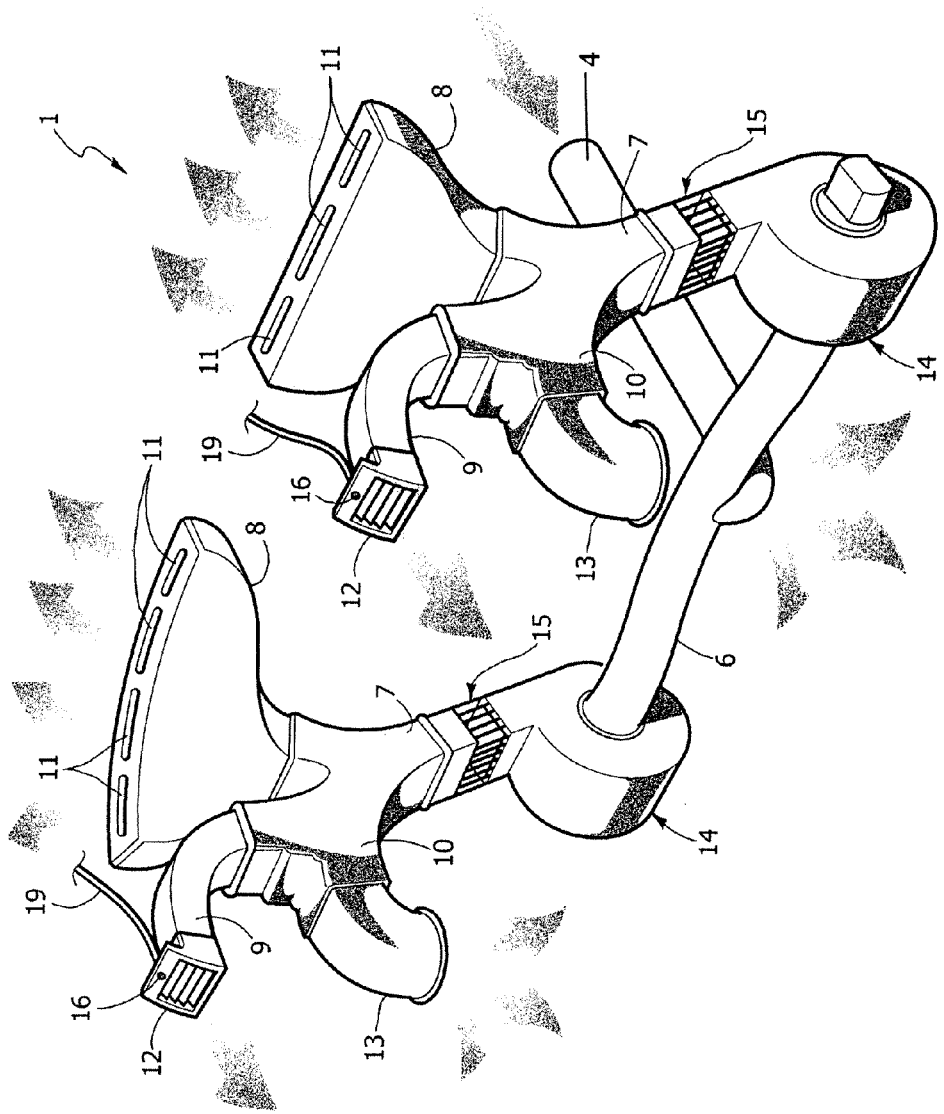
FIG. 1 is a schematic perspective view of a system for air distribution in the passenger compartment of a motor vehicle made according to the present invention.

The air-distribution system illustrated in FIG. 1 is of the type forming the subject of the European patent application No. EP-A-1544005 filed in the name of the present applicant. It should be noted, however, that the present invention is of general application and can, consequently, be employed in any system for air distribution in the passenger compartment of a motor vehicle, as likewise in the field of vehicles in general. A system of the type described above can also be used, for example, for controlling the outlets for outflow of air into the passenger compartment of an aircraft or of a boat or of a dwelling or building in general.

In the drawings, the reference number 1 designates as a whole an air-distribution system associated to the dashboard 2 (illustrated only partially in FIG. 2) of a motor vehicle. The distribution system 1 comprises a main duct 4, which receives air from a conditioning system, including a main fan (not illustrated) and a heater/evaporator (not illustrated). The main duct 4 gives out into a manifold or rail 6, from which there branch off four auxiliary ducts 7 (only two of which may be seen in FIG. 1) distributed in parallel along the dashboard, one pair on the driver side, and one pair on the passenger side, each pair comprising a duct adjacent to the central part of the dashboard and a duct closer to a side window of the motor vehicle. Each auxiliary duct 7 branches into three terminal ducts 8, 9, 10, each of which terminates on outlets for outflow of air into the passenger compartment of a motor vehicle. In particular, the duct 8 supplies air outlets 11 arranged at the base of the windscreen so as to direct the flow of air on the internal surface of the windscreen itself. The duct 9 terminates on one or more air outlets 12 arranged at the front on the dashboard so as to direct air into the passenger compartment of the motor vehicle, and the duct 10 terminates on one or more air outlets 13, which direct a flow of air towards the floor of the passenger compartment.

Arranged in the area where each auxiliary duct 7 branches into the three terminal ducts 8, 9, 10 are means for distributing the flow of air between the terminal ducts. Said means can be constituted, in a way in itself known, by louvers for deviation of the flow (not illustrated) or else, according to a technology developed by the present applicant and forming the subject of a wide range of prior patents, can be constituted by elements designed to cause deviation of the air flow by the Coanda effect. A solution of this type is, for example, described and illustrated in the international patent application No. WO 2004/065149 filed in the name of the present applicant.

In the specific case of the system illustrated in FIG. 1, each of the auxiliary ducts 7 is provided with an additional and independent unit for adjustment of at least one characteristic of the air flow. In particular, associated to each auxiliary duct 7 is, in the example of embodiment illustrated, a unit 14 for adjusting the air flowrate, and a unit 15 for adjusting the temperature of the air. The unit 14 comprises a fan with corresponding electric control motor, whilst the unit 15 comprises a section of duct, inserted in which is an electrical resistance. As has already been indicated above, however, said specific embodiment is provided herein purely by way of example, it being evident that the teachings of the present invention can be applied to any type of air-distribution system, provided that it is equipped with one or more outlets for outflow of air into the passenger compartment of the vehicle that can be activated by switching them into an open condition and/or by enabling supply of a flow of air through the duct that supplies them.

To return to the specific example illustrated, the distribution system 1 enables adjustment of the flowrate and/or the temperature of the flow of air leaving the air outlets 11, 12, 13, separately for each of the auxiliary ducts 7, i.e., once again in the case of the example illustrated, separately for the driver area and for the passenger area and, for each of said areas, separately for the central area of the dashboard and for the area adjacent to the window.

Figure 6:
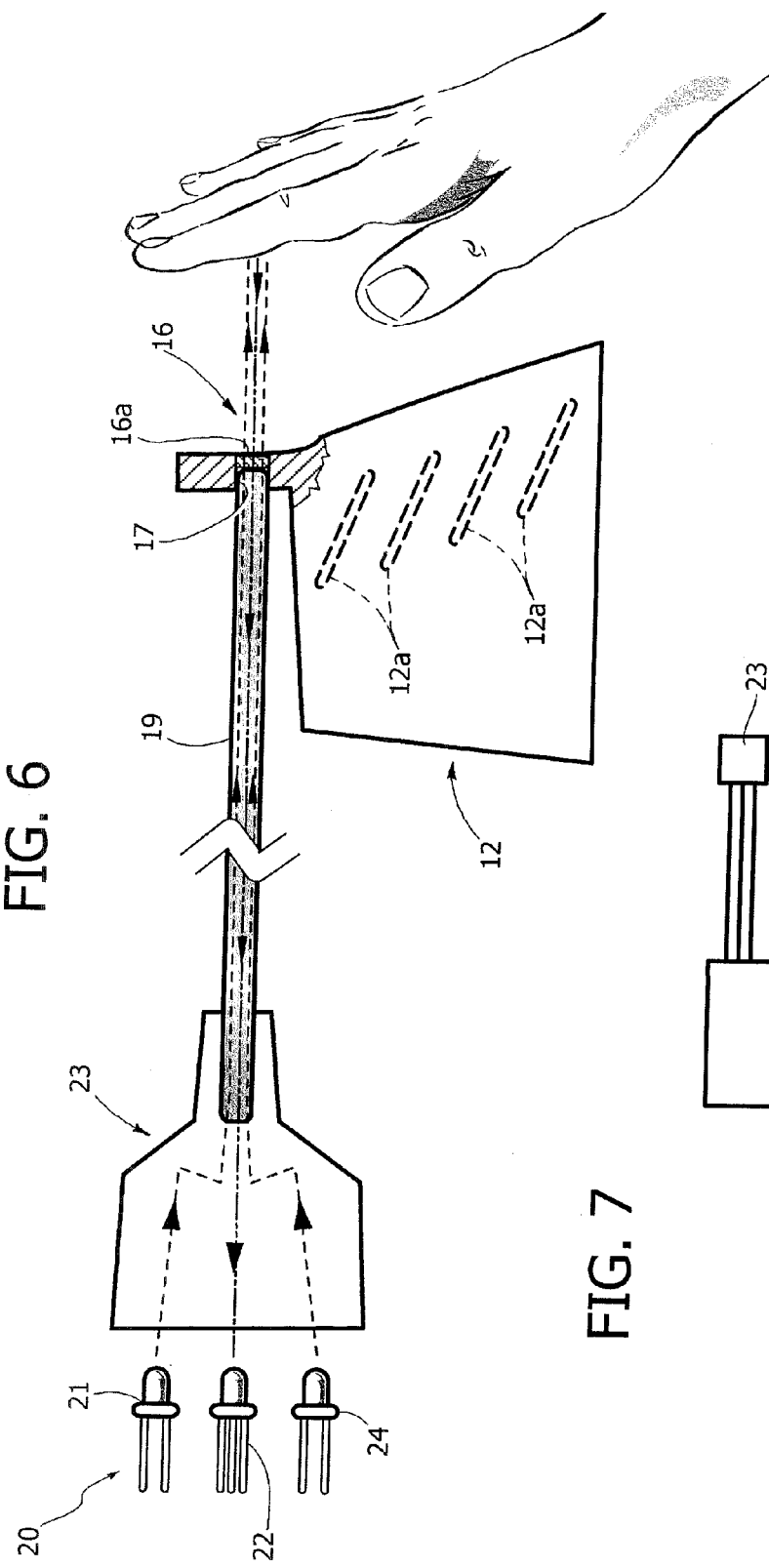
FIG. 6 is a schematic side view corresponding to that of FIG. 5.

In a way similar to what is envisaged in the system proposed in the European patent application No. EP 04425861.4 filed in the name of the present applicant, still secret at the date of filing of the present application, each outlet 12 for outflow of air into the passenger compartment of the motor vehicle is associated to an optical sensor, which is designed to cause automatic switching of the air outlet from the condition in which it is found (open or closed) to the opposite condition when a body is set at a short distance in front of it so that the air outlet can be switched from the open condition to the closed condition or vice versa, for example, when a hand is put at a short distance in front of it, without touching it, as illustrated in FIG. 6 of the annexed drawings. However, unlike the solution proposed in the document No. EP 04425861.4, the system according to the invention uses a sensor, which is set at distance from the respective air outlet and is optically connected to a window adjacent to the air outlet via a light guide, specifically an optical fibre.

In FIG. 1, the window associated to each air outlet 12 is designated by the reference number 16 and is constituted by a hole 17 (see FIG. 3) made in a wall 18, which projects at the top from the body of the air outlet 12 and is preferably provided with a transparent protection element 16a, possibly provided with optical properties and made, for example, of plastic material. Mounted within the hole 17 by interference fit is the end of an optical fibre 19 which optically couples the window 16 to a sensor assembly, designated as a whole by the reference number 20.

In the embodiment illustrated in the annexed drawings, each sensor assembly 20 associated to each air outlet 12 includes an emitter source of infrared light 21 (for example, a LED), and an infrared receiver-detector 22. The emitter 21 and the detector 22 are optically coupled, via an optical-coupling device 23 of the known type referred to as "triplexer", to the same optical fibre 19, in such a way that the infrared radiation emitted by the emitter 21 traverses the optical fibre 19 (see the arrows in FIG. 6), comes out from the window 16, and, if reflected by a foreign body such as the hand M purposely set by the user in front of the air outlet 12, returns through the window 16 and again traverses in the opposite direction the optical fibre 19 until it is received by the detector 22.

In the case of the example of embodiment illustrated, the triplexer device 23 also connects to the optical fibre 19 a light source 24, which lights up the window 16 through the optical fibre 19. The light source 24 is designed to provide the user with the possibility of checking whether the air outlet is in the activated condition or in the de-activated condition simply by looking at the window 16. For example, it is possible to envisage that the source 24 lights up when the air outlet is activated and is off when the air outlet is de-activated, or else that it changes colour (for example, between red and green) according to the condition of the air outlet.

As may be seen in FIGS. 4 and 6, the end of the optical fibre 19 opposite to the air outlet is inserted in a hole 23a made in a neck 23b of the triplexer device 23. For protection against dust, a sheath 23c, for example made of rubber and having a substantially tubular shape, has one end fitted around the optical fibre 19 and the opposite end fitted around the neck 23b.

Figure 2:
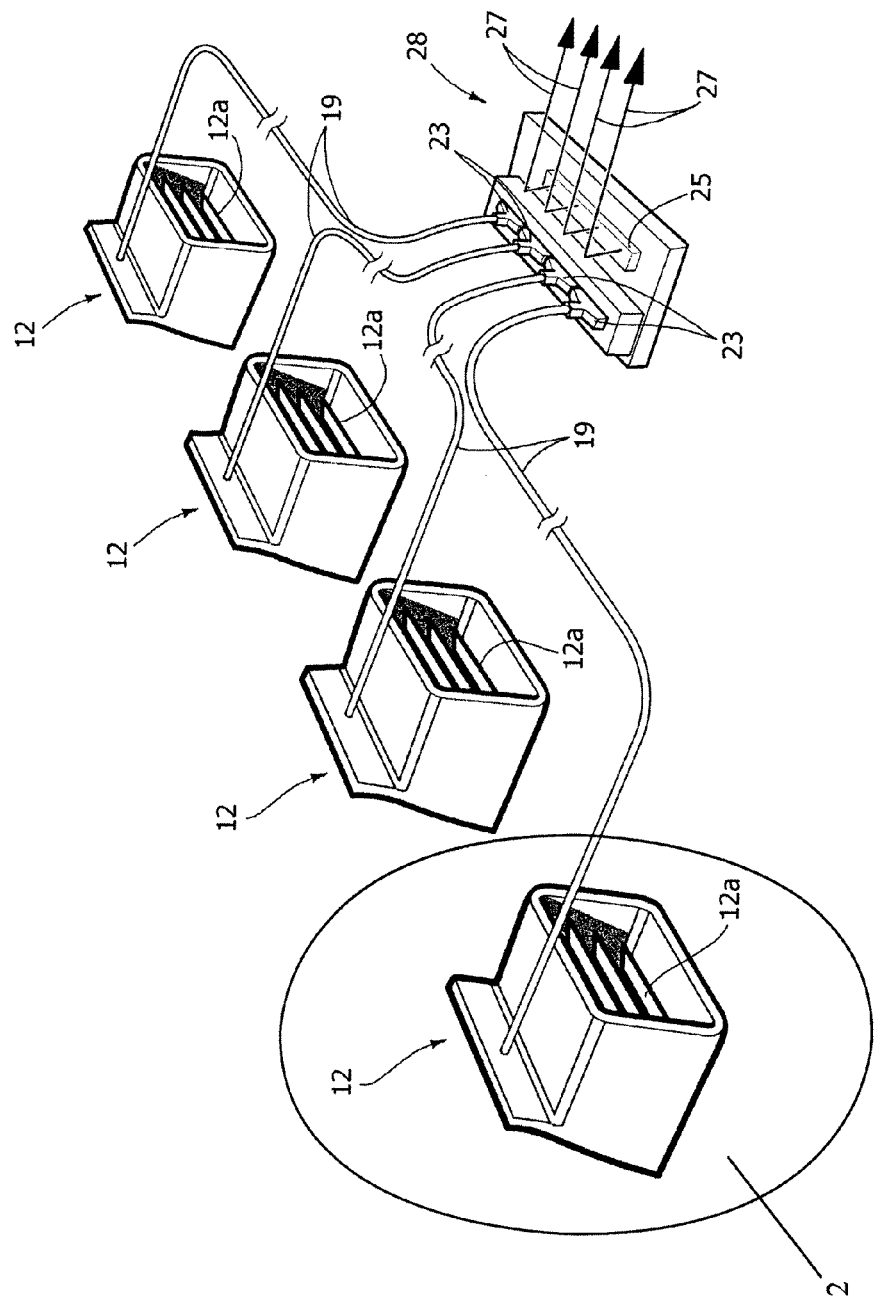
FIG. 2 is a schematic perspective view that shows the system according to the invention.
Figure 5:
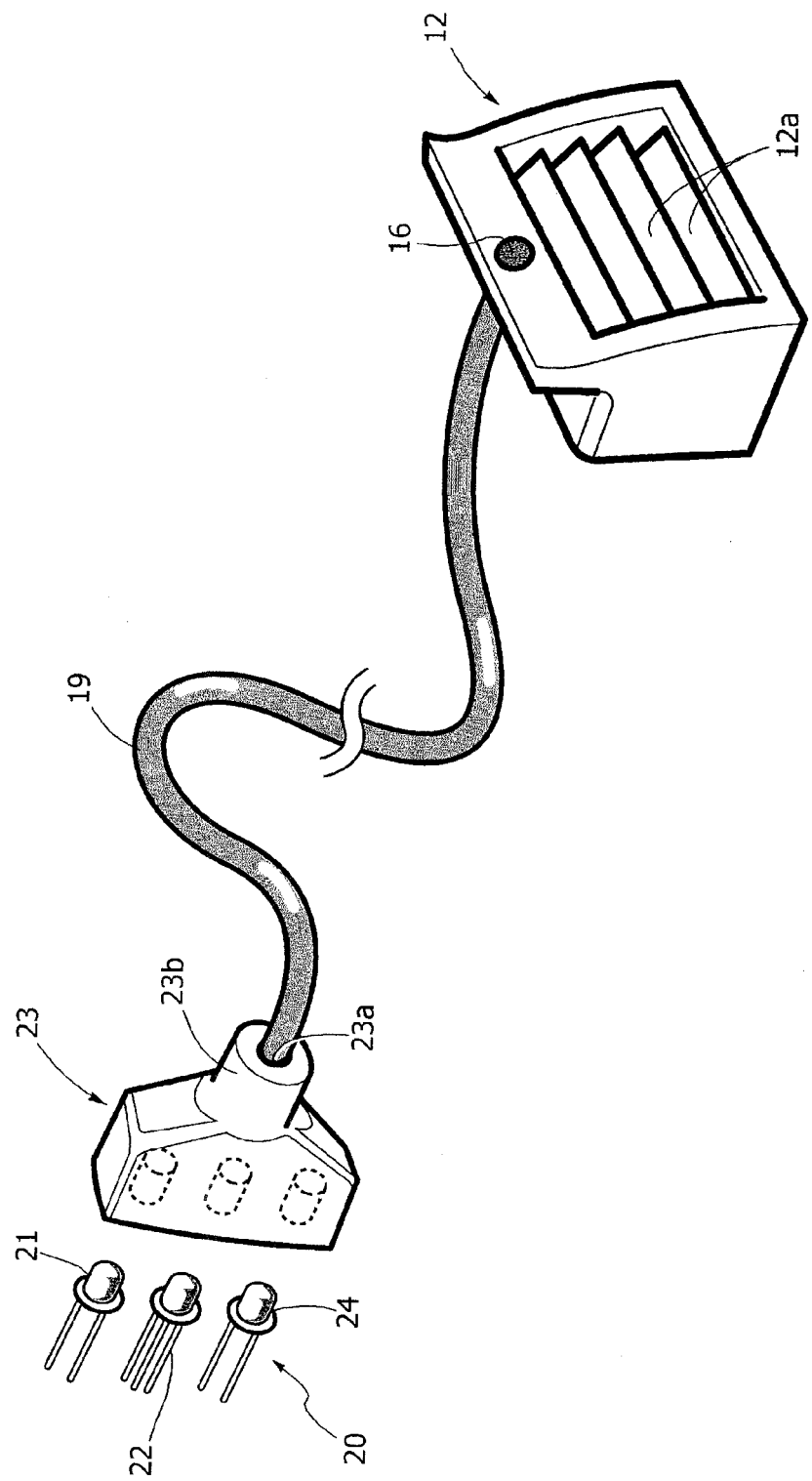
FIG. 5 is a further perspective view at an enlarged scale that illustrates a detail of the system according to the invention.
Figure 7:
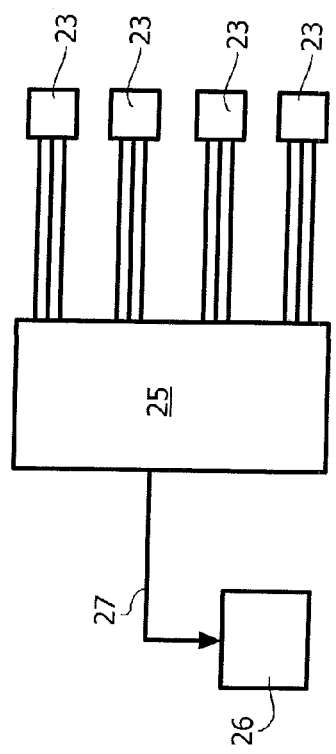
FIG. 7 is a block diagram that illustrates the control device of the system according to the invention.

As may be seen in FIG. 2, the triplexer devices 23 associated to the various air outlets are fitted on top of a supporting structure 24, which incorporates the electrical connections of the emitter 21, of the detector 22, and of the light source 24 associated to each triplexer 23 with an electronic control unit 25. As may be seen also in FIG. 7, the electronic control unit 25 is connected to the devices 21, 22, 24 optically coupled to each air outlet 12 and connected to actuator means 26 via a connector 27 such that electronic control unit 28 controls entry into action of actuator means 26 constituted by a plurality of separate actuators, each designed to control the activated condition or de-activated condition of each air outlet 12. As already mentioned above, activation of the air outlet can consist in controlling opening or closing of a plurality of orientable slats 12a (FIG. 6) with which the air outlet is provided and/or activation of a device designed to enable a flow of air to reach the air outlet, for example, constituted by a fan, or else by a deflector of the flow of air in the aeration system, for instance, of the Coanda-effect type described in the prior patent applications cited above filed in the name of the present applicant.

As is evident from the foregoing description, thanks to the arrangement forming the subject of the present invention all the sensor means associated to the various air outlets are concentrated in one and the same unit 28 (FIG. 2) that can be pre-assembled and can then be installed in a convenient and fast way.

As already indicated above, the electronic control unit 25 controls the actuator associated to each air outlet 12 whenever the user puts, for example, a hand in front of the air outlet to bring about its change of state (from activated to de-activated or vice versa). In addition, the electronic control unit 25 controls the light source 24 associated to each air outlet so as to supply an optical information indicating the state of the air outlet, which enables the user to ascertain said state without any direct check, and in particular without the need to put a hand in front of the air outlet to check whether a flow of air comes out therefrom, which could cause an undesirable switching of state of the air outlet.

Finally, according to a further preferred characteristic, the electronic control unit 25 is designed to control each emitter 21 in such a way that the emitter 21 emits infrared radiation according to an encoded pulse sequence. The same electronic control unit is also designed to check that the reflected radiation received by the detector 22 corresponds to the same encoded sequence of pulses so as to enable switching of state of the air outlet 12. In this way, the electronic control unit 25 is consequently able to distinguish the signals received by the detector 22 that depend on the user's desire to cause switching of state the air outlet from optical signals due to other reasons, for example rays of light coming from the outside of the motor vehicle that impinge upon the window of the air outlet. Any risk of the air outlet being accidentally governed by extraneous factors contrary to the intention of the user is thus prevented.

Furthermore, of course, without prejudice to the principle of the invention, the details of construction and the embodiments may widely vary with respect to what is described and illustrated herein, without thereby departing from the scope of the present invention.

What is claimed is:

1. A system for air distribution in a passenger compartment of a vehicle comprising:
    at least one air outlet for outflow of air into the passenger compartment of the vehicle,
    a duct for supplying a flow of air to said at least one air outlet,
 means for activating the air outlet, said means for activating include a proximity sensor, which is associated to said air outlet and is configured to output an electrical signal of activation of the air outlet in response to detecting a presence of a body at a short distance from the air outlet,
    said sensor being activated only when a body is set adjacent to the air outlet and wherein said means for activating comprise:
        an actuator designed to switch said air outlet from a de-activated condition to an activated condition, and to switch said air outlet from the activated condition to the deactivated condition;
        an electronic control unit configured to receive a signal output by said sensor and to control said actuator such that, whenever the sensor is activated, the actuator brings the air outlet from the condition in which it is found, whether activated or de-activated, to an opposite condition; and
    said sensor being set at a distance from said air outlet and optically connected to a window adjacent to the air outlet via a light guide;
    said sensor comprises an optical emitter and an optical receiver, said emitter configured to emit an encoded optical pulse sequence through said light guide and output from said window, said optical receiver configured to receive radiation reflected by a body set in front of said window, the radiation reflected by said body returning through said window and through said light guide to said receiver;
    said emitter controlled by said electronic control unit in such a way as to emit said encoded optical pulse sequence, said electronic control unit connected to said receiver and programmed to distinguish between optical signals received by said receiver resulting from a reflection of the optical pulse sequence emitted by said emitter and other optical signals; and
    a triplexer coupling said emitter, said receiver, and a light source to said light guide.

2. The system according to claim 1, wherein said light guide is an optical fiber.

3. The system according to claim 1, wherein said light guide is also used for conveying the light emitted by light-source means as far as said window and in that said light-source means are controlled by said electronic control unit in such a way as to cause a switching of state from on to off or off to on, or to cause a change of color according to the condition of the air outlet, said condition comprising being activated or deactivated.

4. The system according to claim 1, wherein said actuator is configured to drive displacement of a plurality of oscillating slats or other mechanical closing means associated to the air outlet between the condition of closing and the condition of opening of the air outlet.

5. The system according to claim 1, wherein said actuator is designed to deflect into the supply duct a flow of air coming from an air-supply source.

6. The system according to claim 1 wherein the vehicle comprises a motor vehicle and the system is located in a dashboard of the motor vehicle.

7. The system of claim 1 wherein the means for activating comprises means for at least one of controlling opening of said air outlet and for enabling supply of a flow of air to the air outlet through said duct.

8. The system of claim 1 wherein said sensor is activated when a hand is put in front of said air outlet.

9. The system of claim 1 wherein said at least one air outlet is received in an outlet body, said window received in said body.

10. A system for air distribution in a passenger compartment of a vehicle comprising:
- at least one air outlet for outflow of air into the passenger compartment of the vehicle,
- a duct for supplying a flow of air to said at least one air outlet, means for activating the air outlet, said means for activating include a proximity sensor, which is associated to said air outlet and is configured to output an electrical signal of activation of the air outlet in response to detecting a presence of a body at a short distance from the air outlet,
- said sensor being activated only when a body is set adjacent to the air outlet and wherein said means for activating comprise:
  - an actuator designed to switch said air outlet from a de-activated condition to an activated condition, and to switch said air outlet from the activated condition to the de-activated condition;
  - an electronic control unit configured to receive a signal output by said sensor and to control said actuator such that, whenever the sensor is activated, the actuator brings the air outlet from the condition in which it is found, whether activated or de-activated, to an opposite condition;
- said sensor being set at a distance from said air outlet and optically connected to a window adjacent to the air outlet via a light guide;
- said sensor comprising an optical emitter and an optical receiver, said emitter configured to emit an encoded optical pulse sequence through said light guide and output from said window, said optical receiver configured to receive radiation reflected by a body set in front of said window, the radiation reflected by said body returning through said window and through said light guide to said receiver;
- said emitter controlled by said electronic control unit in such a way as to emit said encoded optical pulse sequence said electronic control unit connected to said receiver and programmed to distinguish between optical signals received by said receiver resulting from a reflection of the optical pulse sequence emitted by said emitter and other optical signals; and
- a light source optically connected to the window by the light guide and controlled by said electronic control unit to provide an indication of an activated condition or a de-activated condition of said air outlet.

11. The system of claim 10 wherein said control unit is configured to control said light source to change a color produced by said light source in response to a switch by said activator of said air outlet from a de-activated condition to an activated condition and from an activated condition to a de-activated condition.

* * * * *